(12) United States Patent
Kanai et al.

(10) Patent No.: US 10,973,090 B2
(45) Date of Patent: Apr. 6, 2021

(54) INDUCTION HEATING POWER SUPPLY APPARATUS

(71) Applicant: NETUREN CO., LTD., Tokyo (JP)

(72) Inventors: Takahiko Kanai, Tokyo (JP); Masato Sugimoto, Tokyo (JP); Haruki Yoshida, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 307 days.

(21) Appl. No.: 15/747,634

(22) PCT Filed: Sep. 8, 2016

(86) PCT No.: PCT/JP2016/004105
§ 371 (c)(1),
(2) Date: Jan. 25, 2018

(87) PCT Pub. No.: WO2017/043088
PCT Pub. Date: Mar. 16, 2017

(65) Prior Publication Data
US 2019/0008001 A1    Jan. 3, 2019

(30) Foreign Application Priority Data
Sep. 9, 2015    (JP) .............................. JP2015-177757

(51) Int. Cl.
*H02M 7/00*    (2006.01)
*H05B 6/04*    (2006.01)
*H02M 7/5387*    (2007.01)

(52) U.S. Cl.
CPC ............ *H05B 6/04* (2013.01); *H02M 7/5387* (2013.01)

(58) Field of Classification Search
CPC ............ H05B 6/04; H05B 6/06; H05B 6/062; H02M 7/5387; H02M 7/003; H02M 7/48;
(Continued)

(56) References Cited

U.S. PATENT DOCUMENTS

| 5,132,896 A | 7/1992 | Nishizawa et al. |
| 5,623,399 A * | 4/1997 | Ishii .................... H05K 7/1432 363/132 |

(Continued)

FOREIGN PATENT DOCUMENTS

| EP | 1 777 803 | 4/2007 |
| GB | 2 242 580 | 10/1991 |

(Continued)

OTHER PUBLICATIONS

International Search Report and Written Opinion of the International Searching Authority, dated Nov. 25, 2016 in corresponding International Application No. PCT/JP2016/004105.

*Primary Examiner* — Charles P. Cheyney
(74) *Attorney, Agent, or Firm* — Wenderoth, Lind & Ponack, L.L.P.

(57) ABSTRACT

An induction heating power supply apparatus includes a smoothing section to smooth pulsating current of DC power output from a DC power supply section, and an inverter to convert the DC power smoothed by the smoothing section to AC power. The smoothing section includes a pair of bus bars connected to the inverter and a capacitor connected to the pair of bus bars. Each of the bus bars has an external surface extending in a current flow direction, the external surface including a flat face having a larger surface dimension than another face of the external surface in a direction perpendicular to the current flow direction. The bus bars are arranged in a layered manner such that the flat faces of the bus bars are opposed to each other and such that an insulator is sandwiched between the flat faces of the bus bars.

4 Claims, 10 Drawing Sheets

(58) Field of Classification Search
CPC ......... H01L 2924/00; H01L 2924/0002; H01L 2924/13055; H01L 2924/48091; H01L 2924/00014
USPC .................... 219/660; 363/144, 141, 132, 37
See application file for complete search history.

(56) References Cited

U.S. PATENT DOCUMENTS

| | | | | |
|---|---|---|---|---|
| 6,028,779 | A * | 2/2000 | Sakamoto | H02M 7/003 363/55 |
| 6,259,617 | B1 * | 7/2001 | Wu | H02M 7/003 257/724 |
| 6,490,187 | B2 * | 12/2002 | Mori | H02M 5/4585 363/147 |
| 6,493,249 | B2 * | 12/2002 | Shirakawa | H02M 7/003 363/147 |
| 6,570,774 | B1 * | 5/2003 | Moriwaki | H02M 7/003 174/260 |
| 6,650,559 | B1 * | 11/2003 | Okamoto | H01L 23/3672 257/E23.103 |
| 2003/0031038 | A1 | 2/2003 | Shirakawa et al. | |
| 2007/0091652 | A1 * | 4/2007 | Hirota | H02M 7/003 363/37 |
| 2007/0247027 | A1 * | 10/2007 | Kauranen | H01G 9/012 310/330 |
| 2010/0132193 | A1 * | 6/2010 | Yoshinaga | H01G 4/232 29/874 |
| 2012/0234825 | A1 * | 9/2012 | Wang | H02M 1/126 219/660 |

FOREIGN PATENT DOCUMENTS

| | | |
|---|---|---|
| JP | 3-277182 | 12/1991 |
| JP | 2000-152662 | 5/2000 |
| JP | 2002-16202 | 1/2002 |
| JP | 2003-319665 | 11/2003 |
| JP | 2006-19367 | 1/2006 |
| JP | 2009-277577 | 11/2009 |

* cited by examiner

INDUCTION HEATING POWER SUPPLY APPARATUS

TECHNICAL FIELD

The present invention relates to an induction heating power supply apparatus.

BACKGROUND ART

Induction heating is used as a heating method in a treat treatment of steel workpieces. In the induction heating, AC power is applied to a heating coil to cause the heating coil to generate a magnetic field, and a workpiece placed in the magnetic field is heated by electric current induced in the workpiece.

A related art power supply apparatus for supplying AC power to such a heating coil has a converter to convert AC power of a commercial power supply to DC power, a capacitor to smooth pulsating current of the DC power, and an inverter to convert the smoothed DC power back to AC power to generate high frequency AC power to be supplied to the heating coil (see, e.g., JP 2009-277577A).

The inverter typically has a bridge circuit including a plurality of power semiconductor devices capable of performing a high speed switching operation to produce high frequency AC power

SUMMARY

The high speed switching operation of a power semiconductor device causes a rapid change in electric current flowing in the power semiconductor device. The current change di/dt produces surge voltage L×di/dt between terminals of the power semiconductor device due to a parasitic inductance L of a conductive path between the power semiconductor device and the capacitor serving as a voltage source.

Excessive surge voltage may cause a damage to the power semiconductor device. The current change di/dt is primarily determined by the characteristics of the power semiconductor device. Therefore, reducing the parasitic inductance L is a way to suppress the surge voltage.

Illustrative aspects of the present invention provide an induction heating power supply apparatus in which surge voltage is suppressed to improve a protection of an inverter.

According to an illustrative aspect of the present invention, an induction heating power supply apparatus includes a smoothing section configured to smooth pulsating current of DC power output from a DC power supply section, and an inverter configured to convert the DC power smoothed by the smoothing section to AC power. The smoothing section includes a pair of bus bars connected to the inverter and at least one capacitor connected to the pair of bus bars. Each of the bus bars has an external surface extending in a current flow direction. The external surface includes at least one flat face having a larger surface dimension than another face of the external surface in a direction perpendicular to the current flow direction. The pair of bus bars are arranged in a layered manner such that the flat faces of the pair of bus bars are opposed to each other and such that an insulator is sandwiched between the flat faces of the pair of bus bars.

DESCRIPTION OF EMBODIMENTS

Figure 1:
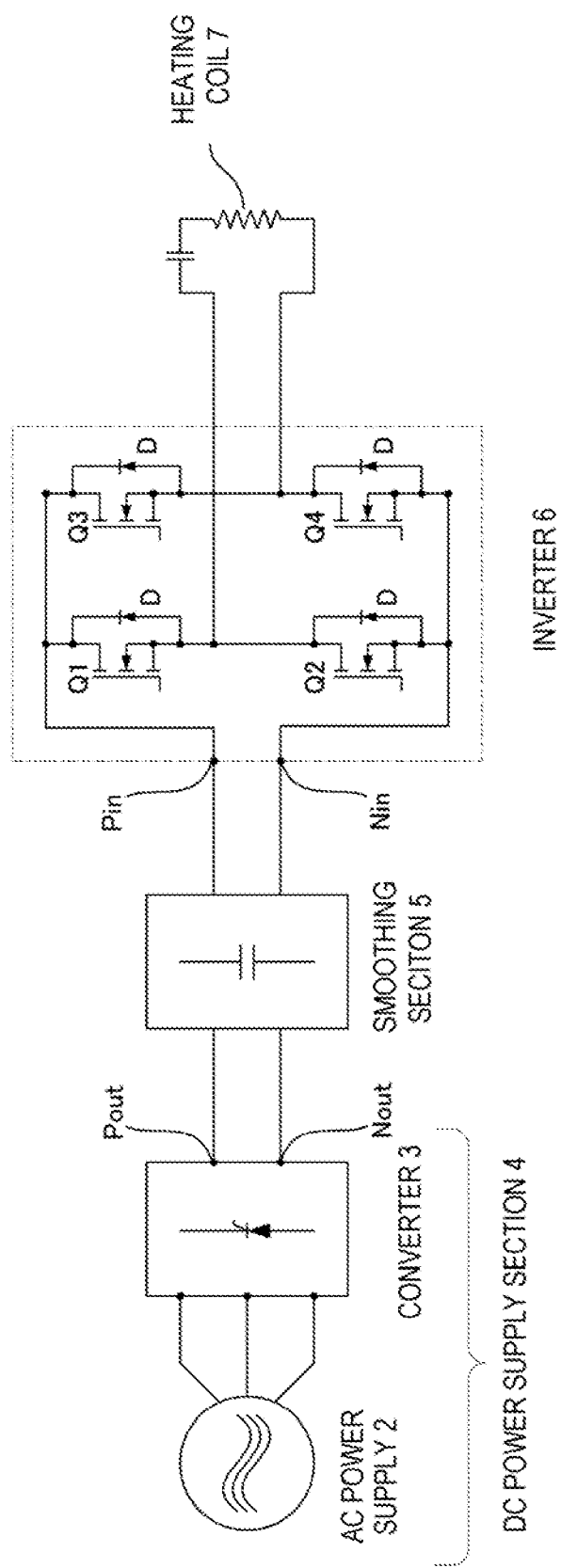
FIG. 1 is a circuit diagram of an induction beating power supply apparatus according to an embodiment of the present invention.

FIG. 1 illustrates an induction heating power supply apparatus 1 according to an embodiment of the present invention.

The induction heating power supply apparatus 1 has a DC power supply section 4, a smoothing section 5 and an inverter 6. The DC power supply section 4 includes a converter 3 configured to convert AC power supplied from a commercial AC power supply 2 to DC power. The smoothing section 5 is configured to smooth pulsating current of the DC power output from the DC power supply section 4. The inverter 6 is configured to convert the DC power smoothed by the smoothing section 5 to high frequency AC power.

The inverter 6 has an arm including power semiconductor devices Q1, Q2 connected in series, and another arm including power semiconductor devices Q3, Q4 also connected in series. The invert 6 is configured as a full bridge circuit so that a series connection point between the power semiconductor devices in each of the arms serves as an output terminal. Freewheel diodes D are connected in parallel with the power semiconductor devices Q1, Q2, Q3, Q4 respectively.

For example, various power semiconductor devices which can perform switching operation, such as an insulated gate bipolar transistor (IGBT) and a metal-oxide-semiconductor field-effect transistor (MOSFET) may be used as each power semiconductor device. In addition, examples of the material of the power semiconductor device may include silicon (Si) and silicon carbide (SiC).

A heating coil 7 is connected between the series connection point of the power semiconductor devices Q1, Q2 and the series connection point of the power semiconductor devices Q3, Q4 so that high frequency power is supplied to the heating coil 7 by the switching operations of the power semiconductor devices Q1, Q2, Q3, Q4.

Figure 2:
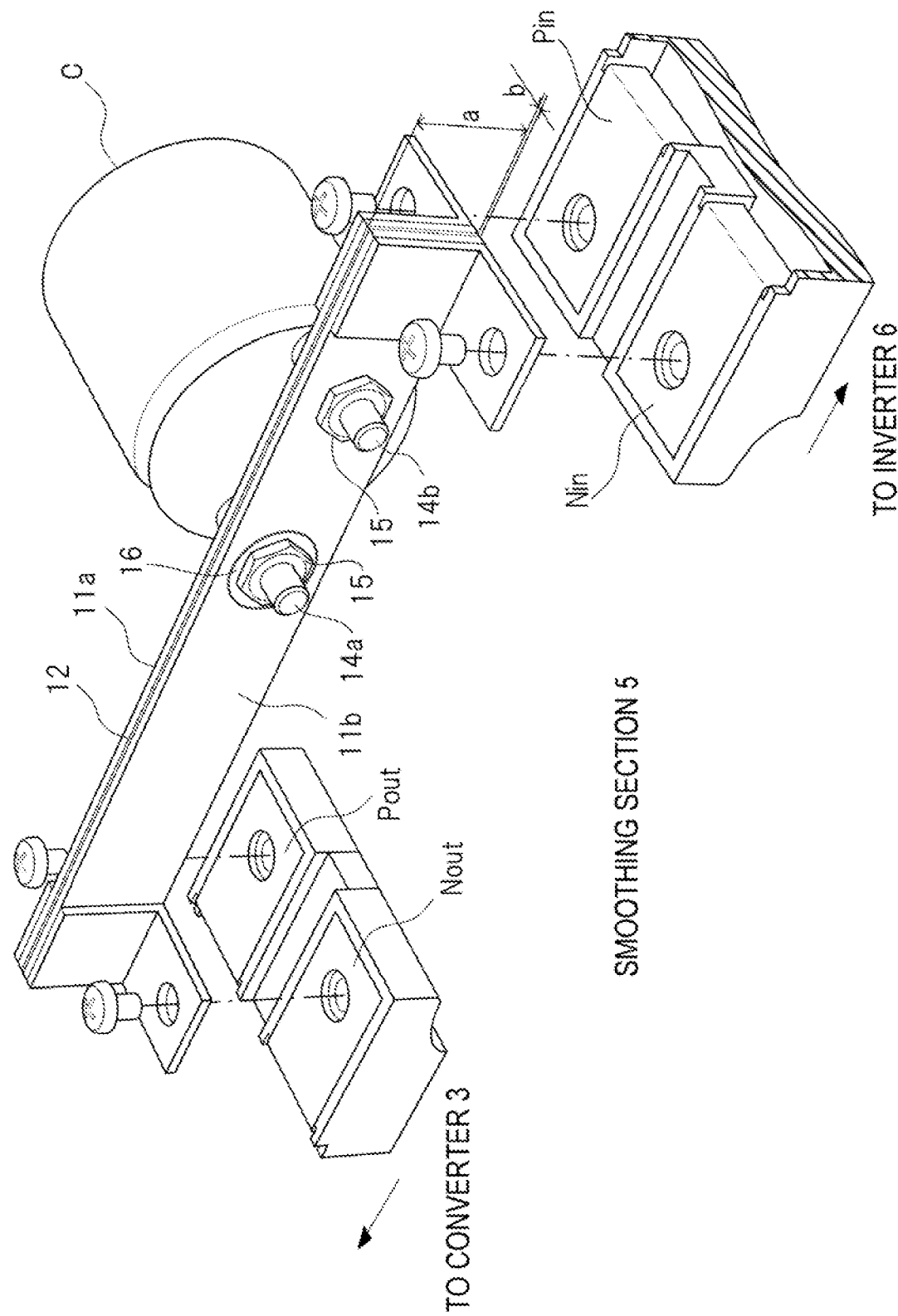
FIG. 2 is a perspective view illustrating an example of a configuration of a smoothing section of the induction heating power supply apparatus of FIG. 1.
Figure 3:
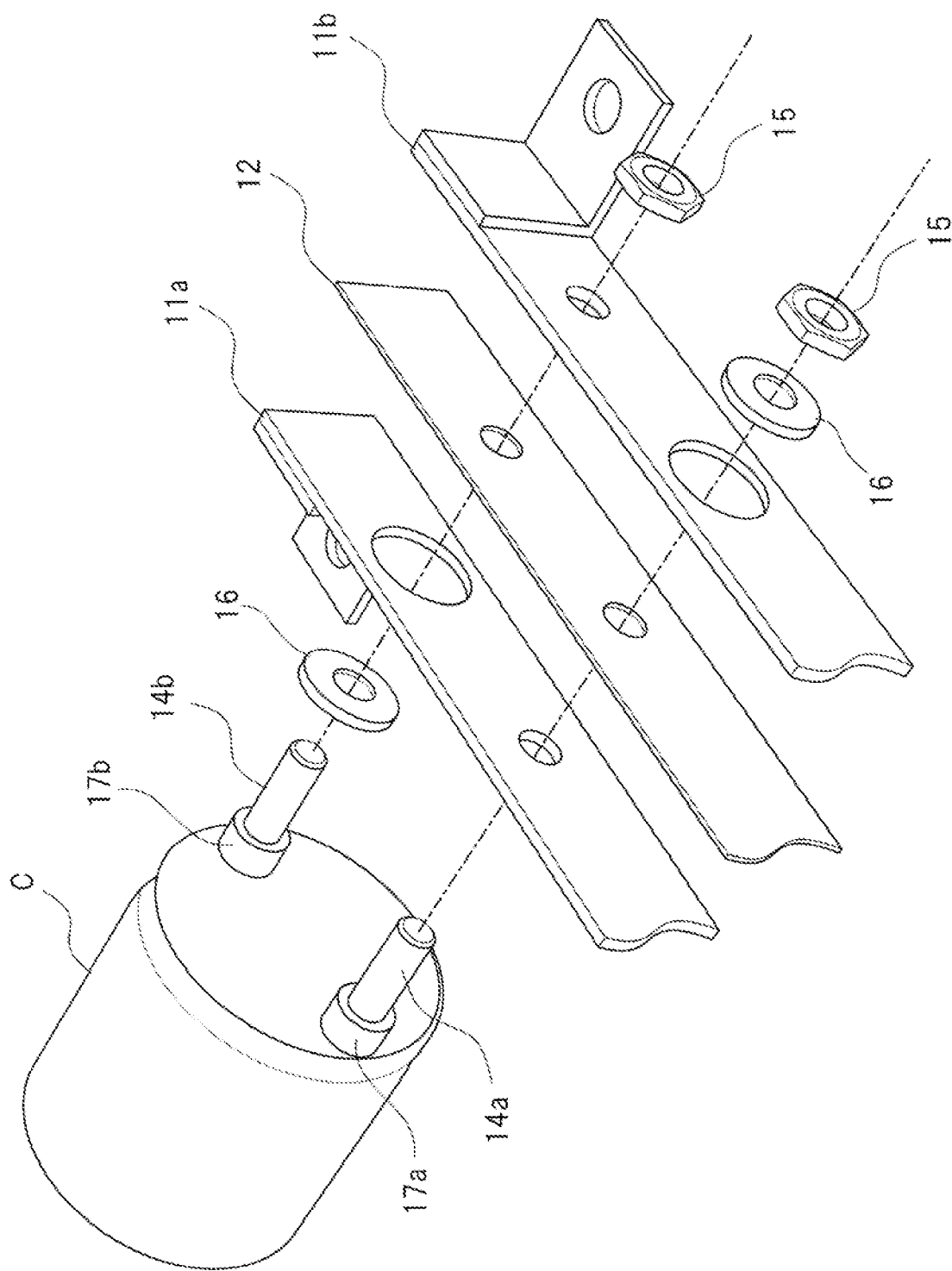
FIG. 3 is an exploded perspective view of the smoothing section of FIG. 2.
Figure 4:
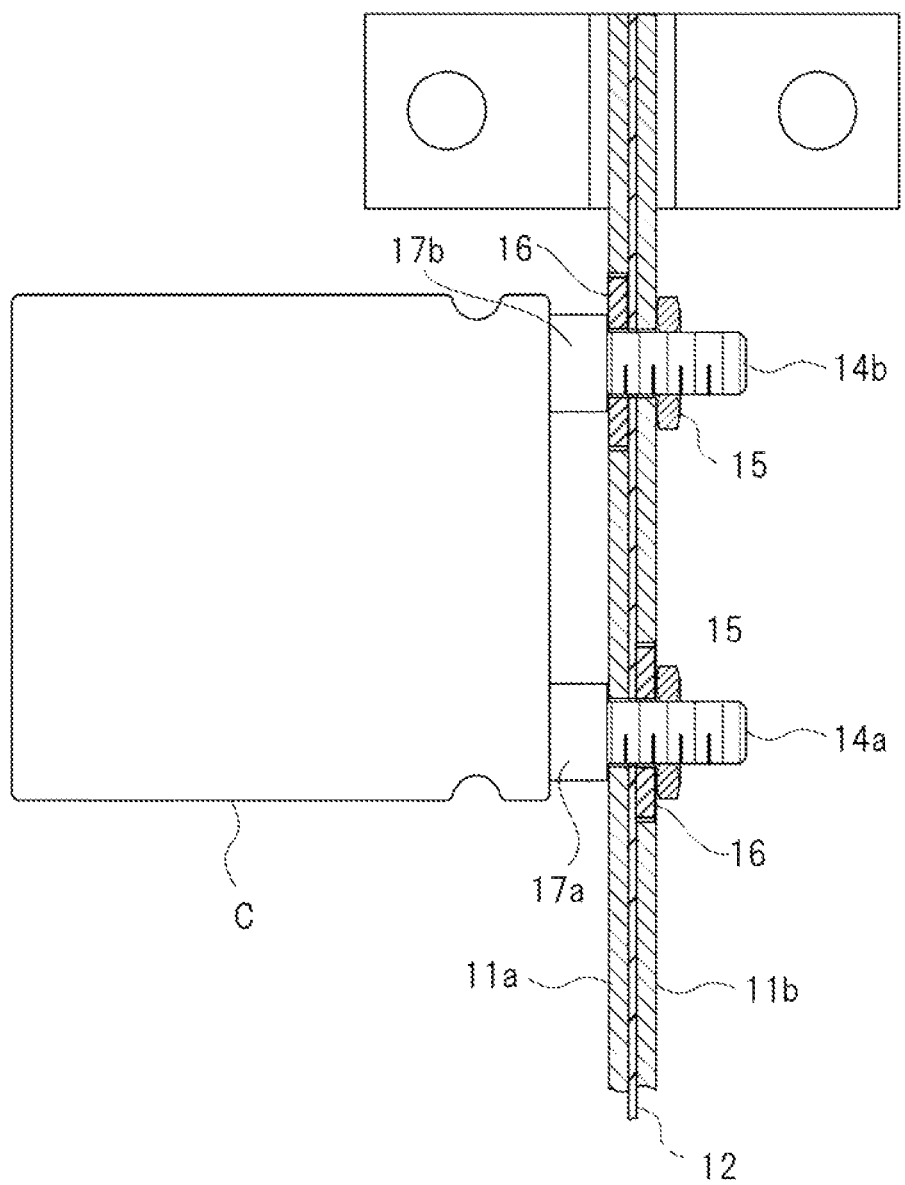
FIG. 4 is a sectional view of the smoothing section of FIG. 2.

FIGS. 2 to 4 illustrate an example of a configuration of the smoothing section 5.

The smoothing section 5 includes a pair of bus bars 11a, 11b, and at least one capacitor C connected to the pair of bus bars 11a, 11b.

Each of the bus, bars 11a, 11b is a flat plate conductor having a pair of flat plate faces and a pair of flat side faces, the pair of flat plate faces and the pair of flat side faces forming the external surface of the conductor extending in a current flow direction (the longitudinal direction). The bus bars 11a, 11b are arranged in a layered manner such that the flat plate faces of the bus bars 11a, 11b or the flat side faces of the bus bars 11a, 11b, those having relatively large surface dimension in a direction (width direction) perpendicular to the current flow direction are opposed to each other and such that an insulator sheet 12 is sandwiched between the bus bars 11a, 11b.

One end portion of the bus bar 11a is connected to a positive electrode Pout of an output terminal of the converter 3 while the other end portion of the bus bar 11a is connected to a positive electrode Pin of an input terminal of the inverter 6. One end portion of the bus bar 11b is connected to a negative electrode Nout of an output terminal of the converter 3 while the other end portion of the bus bar 11b is connected to a negative electrode Nin of an input terminal of the inverter 6.

A pair of terminals 14a, 14b of the capacitor C connected to the bus bars 11a, 11b are formed as screw terminals and arranged side by side on one side of the capacitor C. The terminals 14a, 14b are arranged to extend through the bus bars 11a, 11b and the insulator 12 in a direction in which the bus bars 11a, 11b and the insulator 12 are layered in the order of the bus bar 11a, the insulator 12 and the bus bar 11b. Nuts 15 are screwed onto distal end portions of the terminals 14a, 14b respectively so that the capacitor C is fixed to the bus bars 11a, 11b.

As shown in FIGS. 3 and 4, the terminal 14a and the nut 15 screwed to the terminal 14a are electrically insulated from the bus bar 11b by an insulating washer 16. On the other hand, a large-diameter flange portion 17a formed in a base end portion of the terminal 14a makes contact with the bus bar 11a so that the terminal 14a and the has bar 11a are electrically coupled to each other. Thus, the terminal 14a is connected only to the bus bar 11a.

The terminal 14b and a large-diameter flange portion 17b formed in a base end portion of the terminal 14b are electrically insulated from the bus bar 11a by an insulating washer 16. On the other hand, the nut 15 screwed to the terminal 14b makes contact with the bus bar 11b so that the terminal 14b and the bus bar 11b are electrically coupled to each other through the nut 15. Thus, the terminal 14b is connected only to the bus bar 11b.

Figure 5:
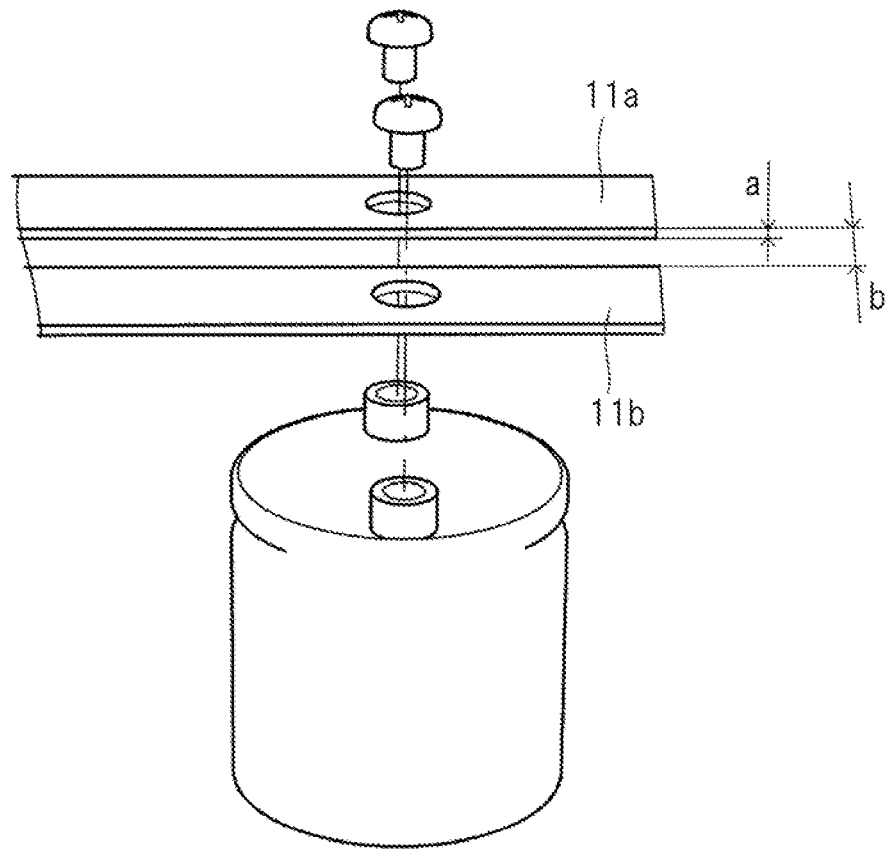
FIG. 5 is a perspective view of a reference example of the smoothing section.
Figure 6:
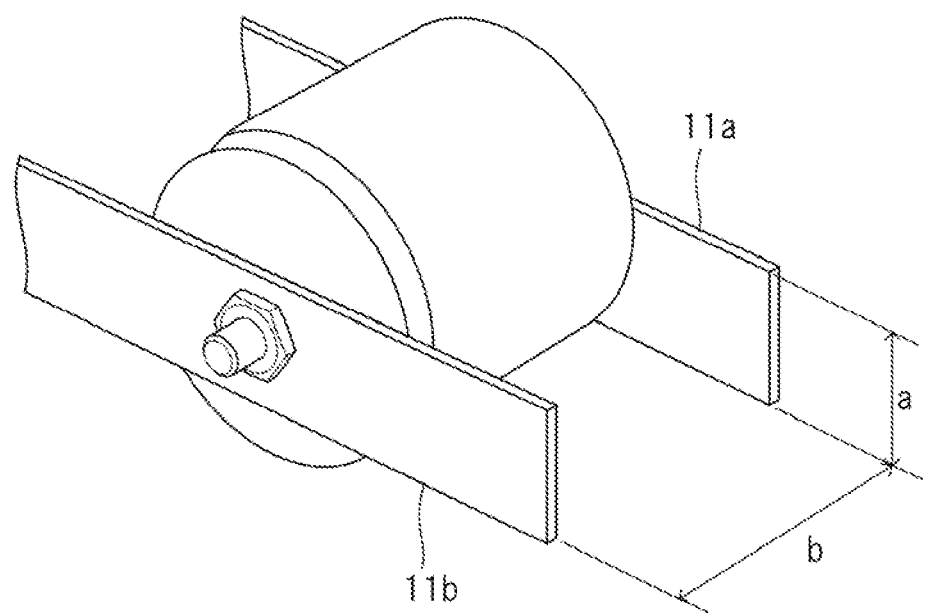
FIG. 6 is a perspective view of another reference example of the smoothing section.

FIGS. 5 and 6 illustrate reference examples of the smoothing section 5 respectively.

In the example shown in FIG. 5, the pair of bus bars 11a, 11b are arranged such that side faces of the bus bars 11a, 11b are opposed to each other. In the example shown in FIG. 6, the pair of bus bars 11a, 11b are arranged such that plate faces of the bus bars 11a, 11b are opposed to each other with a capacitor being interposed between the bus bars 11a, 11b. In the example shown in FIG. 6, one of the pair of the terminals is provided on one side of the capacitor and the other terminal is provided on the opposite side of the capacitor.

The inductance of a pair of parallel flat plate conductors is associated with b/a, wherein "a" is the width of opposed faces of the pair of parallel flat plate conductors, i.e. a dimension in a direction perpendicular to an extension direction of the conductors (flowing direction of a current), and "b" is the distance between the opposed faces of the conductors. More specifically, the inductance becomes smaller as b/a becomes smaller. With the width "a" of the opposed faces being constant, the inductance becomes smaller as the distance "b" between the opposed faces becomes smaller. With the distance "b" between the opposed faces being constant, the inductance becomes smaller as the width "a" of the opposed faces becomes larger.

As shown in FIGS. 2 to 4, the bus bars 11a, 11b are arranged in a layered manner such that the plate faces of the bus bars 11a, 11b are opposed to each other and such that the insulator sheet 12 is sandwiched between the bus bars 11a, 11b. In this case, as compared with the reference example shown in FIG. 5 in which the side faces of the pair of bus bars 11a, 11b are opposed to each other, the width "a" of the opposed faces of the pair of bus bars 11a, 11b is larger so that an inductance of the pair of bus bars 11a, 11b is reduced.

Moreover, as compared with the reference example shown in FIG. 6 in which the plate faces of the pair of bus bars 11a, 11b are opposed to each other and the capacitor is interposed between the bus bars 11a, 11b, the distance "b" between the opposed faces of the pair of bus bars 11a, 11b is shorter so that an inductance of the pair of bus bars 11a, 11b is further reduced.

Thus, by arranging the bus bars 11a, 11b in a layered manner such that the plate faces of the pair of bus bars 11a, 11b are opposed to each other and such that the insulator sheet 12 is sandwiched between the bus bars 11a, 11b, a parasitic inductance of a conductive path between the capacitor C and the power semiconductor devices Q1, Q2, Q3, Q4 to which DC power is supplied from the capacitor C can be reduced. Accordingly, surge voltage occurring between opposite terminals of the power semiconductor devices Q1, Q2, Q3, Q4 due to the parasitic inductance is suppressed so that the protection of the inverter 6 improved.

A film capacitor, a ceramic capacitor, or the like, which is smaller in internal inductance than an electrolytic capacitor is preferably used as the capacitor C.

Although one capacitor C is connected to the pair of bus bars 11a, 11b in the examples described above, a plurality of capacitors C may be connected to the pair of bus bars 11a, 11b in parallel.

Figure 7:
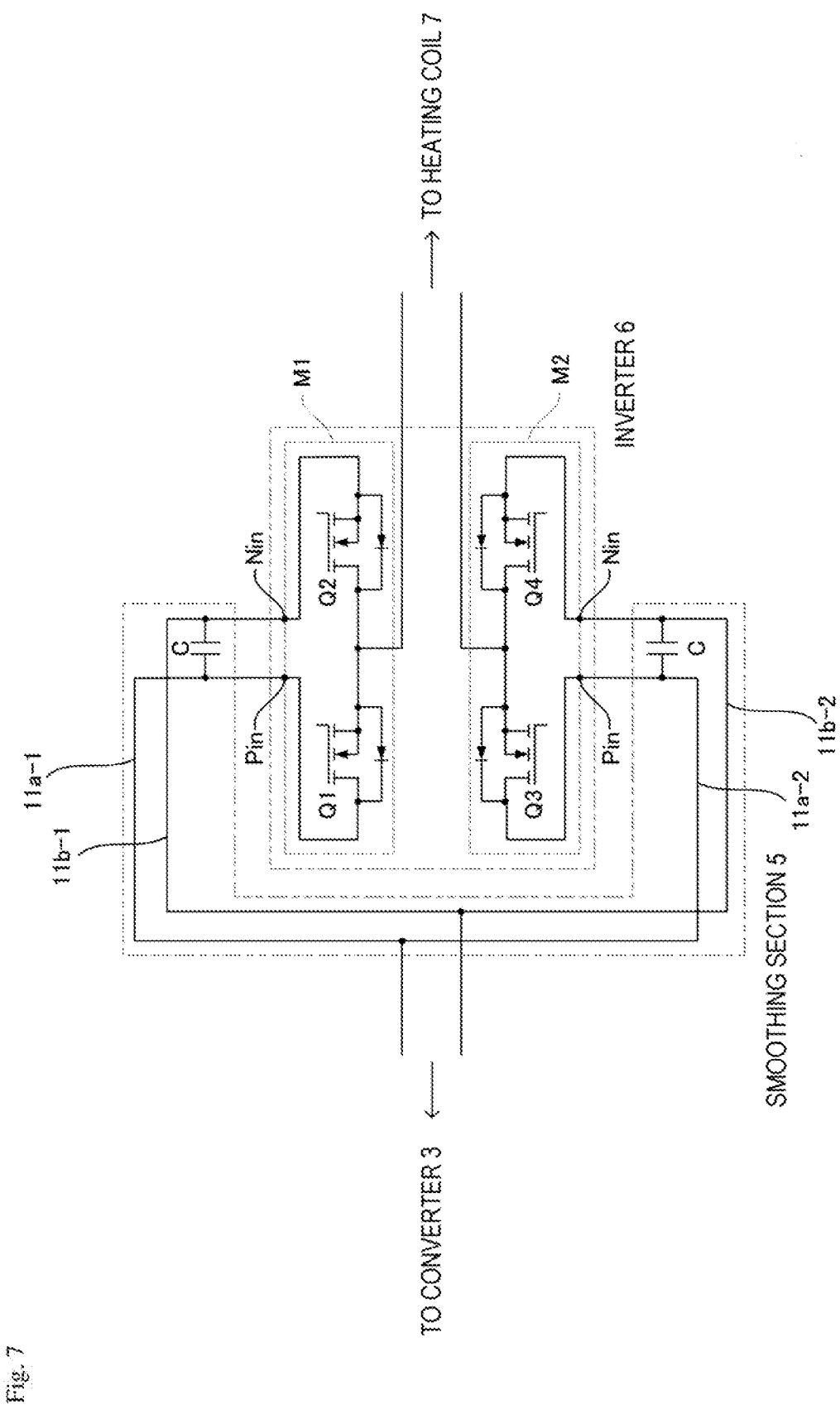
FIG. 7 is a circuit diagram of an induction heating power supply apparatus according to another embodiment of the present invention.

In an example shown in FIG. 7, the arm including the power semiconductor devices Q1, Q2 and the arm including the power semiconductor devices Q3, Q4 are each configured as a module. The first module M1 including the power semiconductor devices Q1, Q2 is connected to a pair of bus bars 11a-1, 11b-1, and a second module M2 including the power semiconductor devices Q3, Q4 is connected to a pair of bus bars 11a-2, 11b-2. In this case, the pair of bus bars 11a-1, 11b-1 and the pair of bus bars 11a-2, 11b-2 may be provided in the smoothing section 5, and each of the pair of bus bars 11a-1, 11b-1 and the pair of bus bars 11a-2, 11b-2 may be configured such that, like the pair of bus bars 11a, 11b described above, the pair of bus bars are arranged in a layered manner with the insulator sheet 12 being sandwiched between the plate faces of the pair of bus bars. At least one capacitor C is connected to the pair of bus bars 11a-1, 11b-1, and at least one capacitor C is connected to the pair of bus bars 11a-2, 11b-2.

Figure 8:
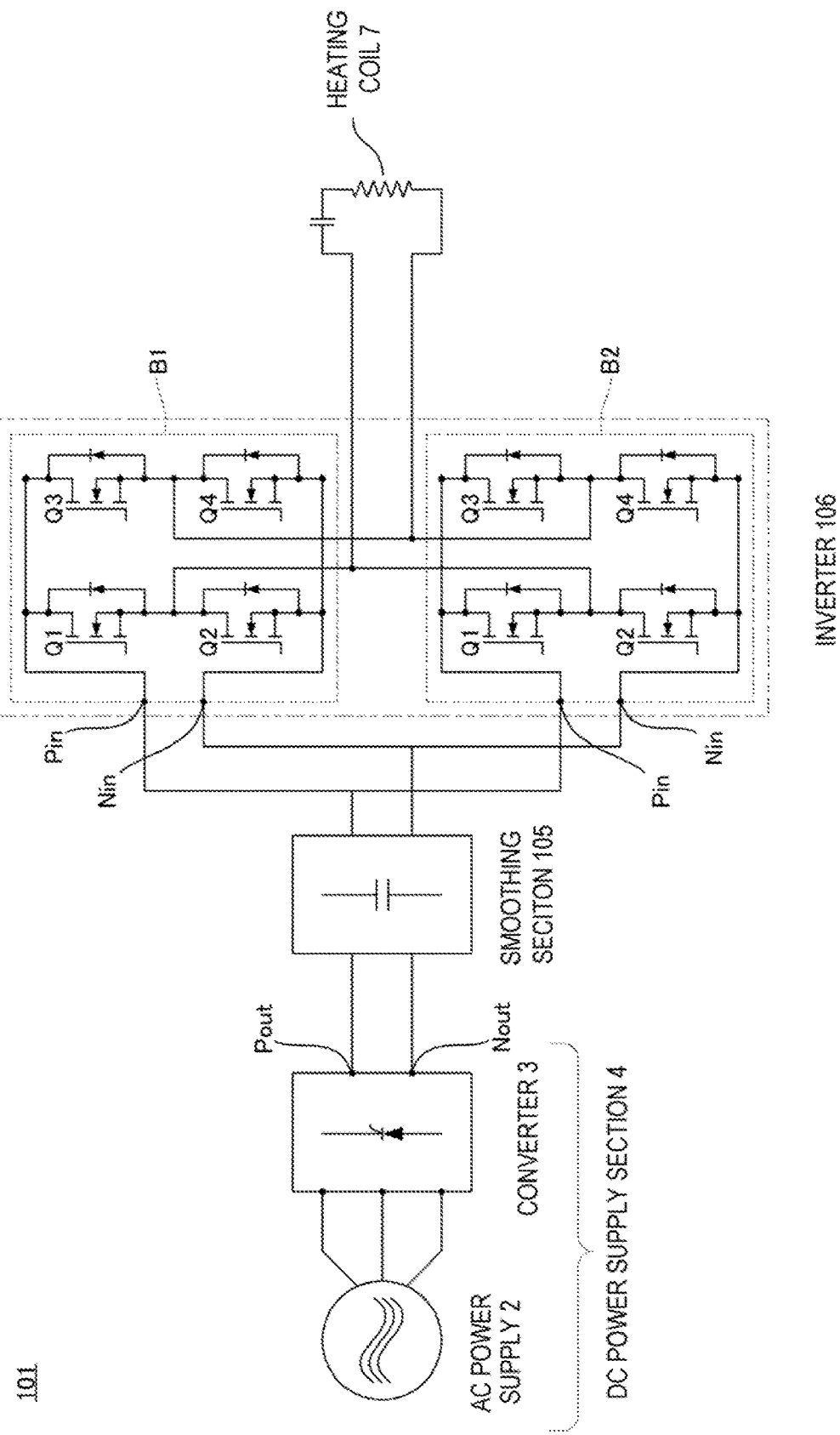
FIG. 8 is a circuit diagram of an induction heating power supply apparatus according to another embodiment of the present invention.

FIG. 8 illustrates an induction heating power supply apparatus 101 according to another embodiment of the present invention. The elements of the induction heating power supply apparatus 101 that are the same as those of the induction heating power supply apparatus 1 described above will be denoted by the same reference signs and description thereof will be omitted or simplified.

The induction heating power supply apparatus 101 includes a DC power supply section a smoothing section 105, and an inverter 106. The DC power supply section 4 includes an AC power supply 2 and a convener 3. The smoothing section 105 is configured to smooth pulsating current of DC power output from the DC power supply section 4. The inverter 106 is configured to convert the DC power smoothed by the smoothing section 105 to high frequency AC power.

A plurality of bridge circuits each formed by a set of power semiconductor devices Q1, Q2, Q3, Q4 are provided in the inverter 106. In the illustrated example, two bridge circuits, i.e. a first bridge B1 and a second bridge B2, are provided in the inverter 106. The first bridge B1 and the second bridge B2 are connected to a heating coil 7 in parallel so that power to be supplied to the heating coil 7 can be distributed into the first bridge B1 and the second bridge B2.

Figure 9:
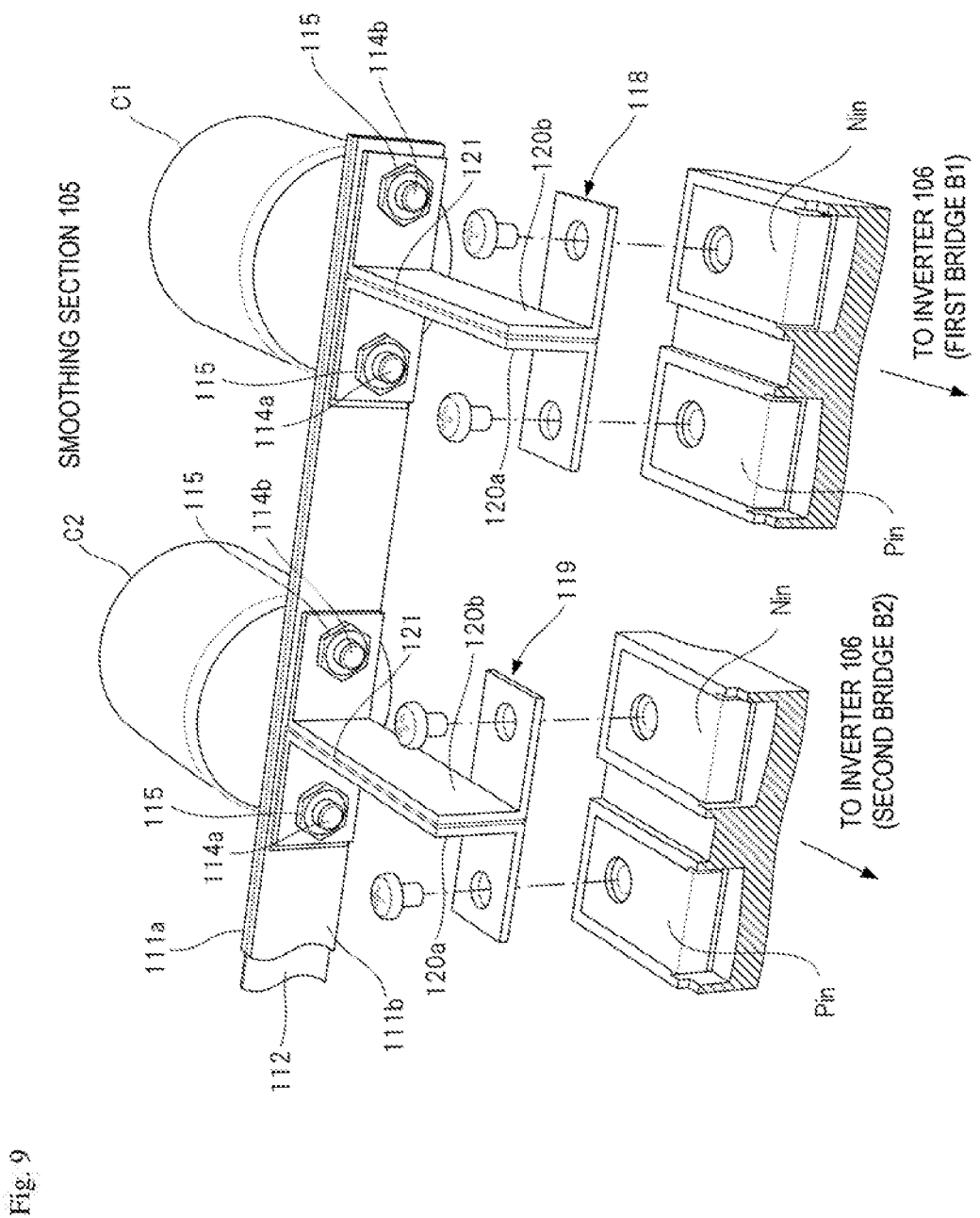
FIG. 9 is a perspective view illustrating an example of a configuration of a smoothing section of the induction heating power supply apparatus of FIG. 8.
Figure 10:
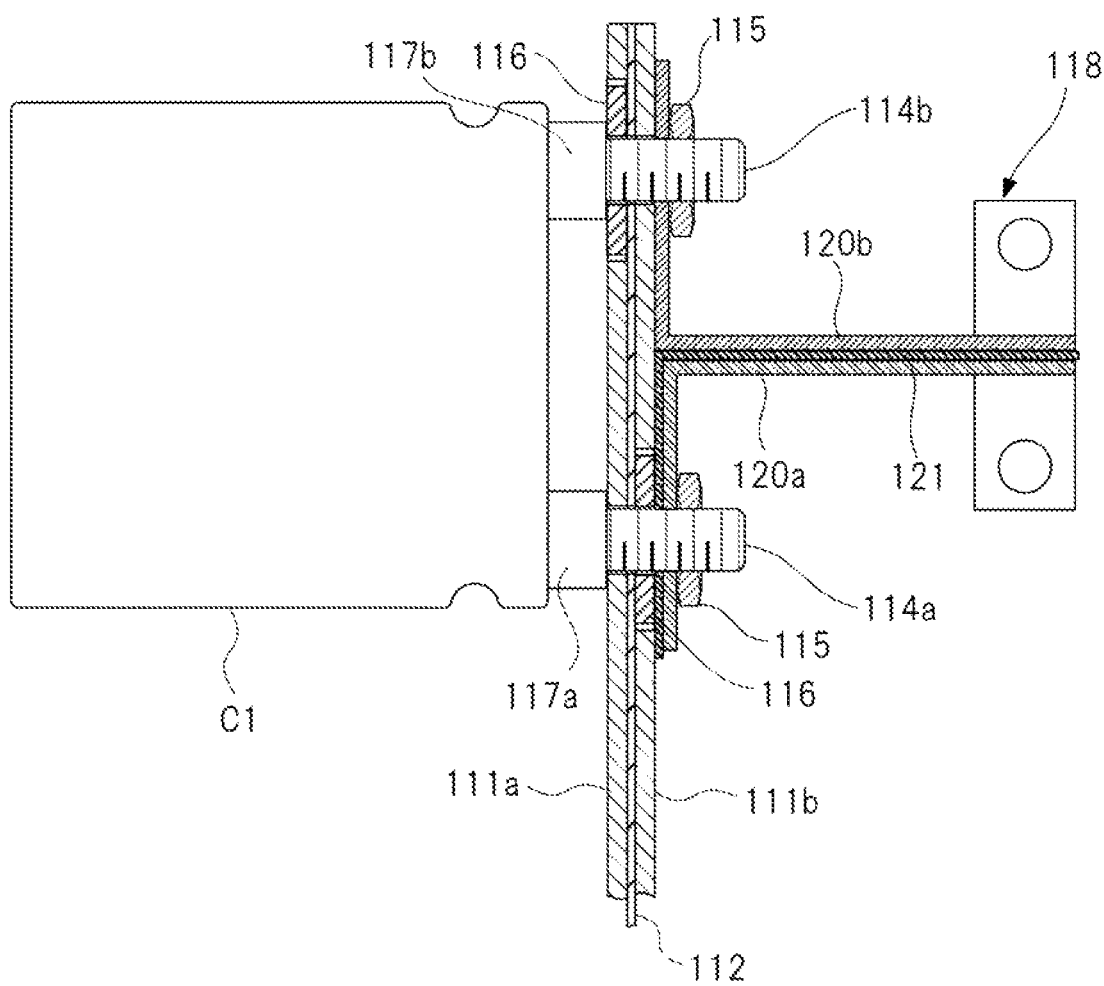
FIG. 10 is a sectional view of the smoothing section of FIG. 9.

FIGS. 9 and 10 show a configuration example of the smoothing section 105.

The smoothing section 105 includes a pair of bus bars 111a, 111b, capacitors C1, C2 and connection portions 118, 119. The capacitors C1, C2 are connected to the pair of bus bars 111a, 111b. The pair of bus bars 111a, 111b are connected to the inverter 106 through the connection portions 118, 119.

Each of the pair of bus bars 111a, 111b is a flat plate conductor having a pair of flat plate faces and a pair of flat side faces, the pair of flat plate faces and the pair of flat side faces forming the external surface of the conductor extending in a current flow direction (the longitudinal direction). The bus bars 111a, 111b are arranged in a layered manner such that the flat plate faces the bus bars 111a, 111b or the flat side faces of the bus bars 111a, 111b, those having a relatively large surface dimension in a direction (width direction) perpendicular to the current flow direction are opposed to each other and such that an insulator sheet 112 is sandwiched between bus bars 111a, 111b. In this manner, an inductance of the bus bars 111a, 111b can be reduced, like the pair of bus bars 11a, 11b of the smoothing section 5 described above.

The connection portions 118, 119 are provided respectively for the bridge circuits of the inverter 106. The connection portion 118 is connected to the first bridge B1. The connection portion 119 is connected to the second bridge B2.

The connection portion 118 includes a pair of flat plate conductors 120a, 120b, and an insulator sheet 121. Each of the pair of conductors 120a, 120b has a pair of flat plate faces and a pair of flat side faces, the pair of flat plate faces and the pair of flat side faces forming the external surface of the conductor extending in a current flow direction thereof. The pair of conductors 120a, 120b are arranged in a layered manner such that the flat plate faces of the conductors 120a, 120b or the flat side faces of the conductors 120a, 120b, those having a relatively large surface dimension in a direction perpendicular to the current flow direction are opposed to each other and such that the insulator 121 is sandwiched between the conductors 120a, 120b. A base end portion of the conductor 120a is arranged on the bus bar 111b such that the insulator 121 is sandwiched between bus bar 111b and the base end portion of the conductor 120a. Thus, the conductor 120a and the bus bar 111b are electrically insulated from each other. A base end portion of the conductor 120b is arranged directly on the bus bar 111b. Thus, the conductor 120b and the bus bar 111b are electrically coupled to each other.

The connection portion 119 also includes a pair of flat plate conductors 120a, 120b, and an insulator sheet 121. The pair of conductors 120a, 120b are arranged in a layered manner such that the plate faces of the conductors 120a, 120b are opposed to each other and such that the insulator 121 is sandwiched between the conductors 120a, 120b. A base end portion of the conductor 120a is placed on the bus bar 111b such that the insulator 121 is sandwiched between the bus bar 111b and the base end portion of the conductor 120a. Thus, the conductor 120a and the bus bar 111b are electrically insulated from each other. A base end portion of the conductor 120b is arranged directly on the bus bar 111b. Thus, the conductor 120b and the bus bar 111b are electrically coupled to each other.

A pair of terminals 114a, 114b of the capacitor C1 are formed as screw terminals and arranged side by side on one side of the capacitor. The terminals 114a, 114b are arranged to extend through the bus bars 111a, 111b and the insulator 112 in a direction in which the bus bars 111a, 111b and the insulator 112 are layered in the order of the bus bar 111a, the insulator 112 and the bus bar 111b. A distal end portion of the terminal 114a extends further through the insulator 121 and the conductor 120a of the connection portion 118 placed on the bus bar 111b. A distal end portion of the terminal 114b extends further through the conductor 120b of the connection portion 118 superimposed on the bus bar 111b. Nuts 115 are screwed onto the distal end portions of the terminals 114a, 114b so that the capacitor C1 is fixed to the bus bars 111a, 111b and the connection portion 118.

The terminal 114a and the bus bar 111b are electrically insulated from each other by an insulating washer 116. A large-diameter flange portion 117a formed in a base end portion of the terminal 114a makes contact with the bus bar 111a so that the terminal 114a and the bus bar 111a are electrically coupled to each other. In addition, the nut 115 screwed to the terminal 114a makes contact with the conductor 120a of the connection portion 118 so that the terminal 114a and the conductor 120a can be electrically coupled to each other through the nut 115. Thus, the terminal 114a is connected to the bus bar 111a and the conductor 120a.

The terminal 114b and a large-diameter flange portion 117b formed in a base end portion of the terminal 114b are electrically insulated from the bus bar 111a by an insulating washer 16. On the other hand, the nut 115 screwed to the terminal 114b makes contact with the conductor 120b of the connection portion 118 so that the terminal 114b can be electrically coupled to the conductor 120b and the bus bar 111b through the nut 115. Thus, the terminal 114b is connected to the bus bar 111b and the conductor 120b.

A distal end portion of the conductor 120a of the connection portion 118 is connected to a positive electrode Pin of an input terminal of the first bridge B1. A distal end portion of the conductor 120b of the connection portion 118 is connected to a negative electrode Nin of an input terminal of the first bridge B1. DC power is supplied from the capacitor C1 to the first bridge B1.

A pair of terminals 114a, 114b of the capacitor C2 are fixed to the bus bars 111a, 111b and the connection portion 119, similarly to the terminals 114a, 114b of the capacitor C1. The terminal 114a is connected to the bus bar 111a and the conductor 120a. The terminal 114b is connected to the bus bar 111b and the conductor 120b.

A distal end portion of the conductor 120a of the connection portion 119 is connected to a positive electrode. Pin of an input terminal of the second bridge B2. A distal end portion of the conductor 120b of the connection portion 119 is connected to a negative electrode Nin of an input terminal of the second bridge B2. DC power is supplied from the capacitor C2 to the second bridge B2.

A plurality of connection portions through which the pair of bus bars 111a, 111b are connected to the inverter 106 are provided respectively for the bridges of the inverter 106. The capacitors are connected to the connection portions 118, 119 respectively. In this manner, both the length of a conductive path between the first bridge B1 and the capacitor C1 which is a voltage source of the first bridge B1, and the length of a conductive path between the second bridge B2 and the capacitor C2 which is a voltage source of the second bridge B2 can be shortened so that a parasitic inductance of each of the two conductive paths can be reduced. Thus, surge voltage occurring between opposite terminals of the power semiconductor devices Q1, Q2, Q3, Q4 due to the parasitic inductance can be suppressed so that protection of the inverter 106 can be enhanced.

Further, by arranging the pair of conductors 120a, 120b of each of the connection portions 118, 119 in a layered manner such that the plate faces of the conductors 120a, 120b are opposed to each other and such that the insulator sheet 121 is sandwiched between conductors 120a, 120b, an inductance of each of the connection portions 118, 119 can be reduced, like the pair of bus bars 111a, 111b. Thus, surge voltage occurring at the opposite terminals of the power semiconductor devices Q1, Q2, Q3, Q4 due to the parasitic inductance is further suppressed to improve the protection of the inverter 106.

Although one capacitor is connected to each of the connection portions 118, 119 in the example described above, a plurality of capacitors may be connected to each of the connection portions 118, 119 in parallel.

Figure 11:
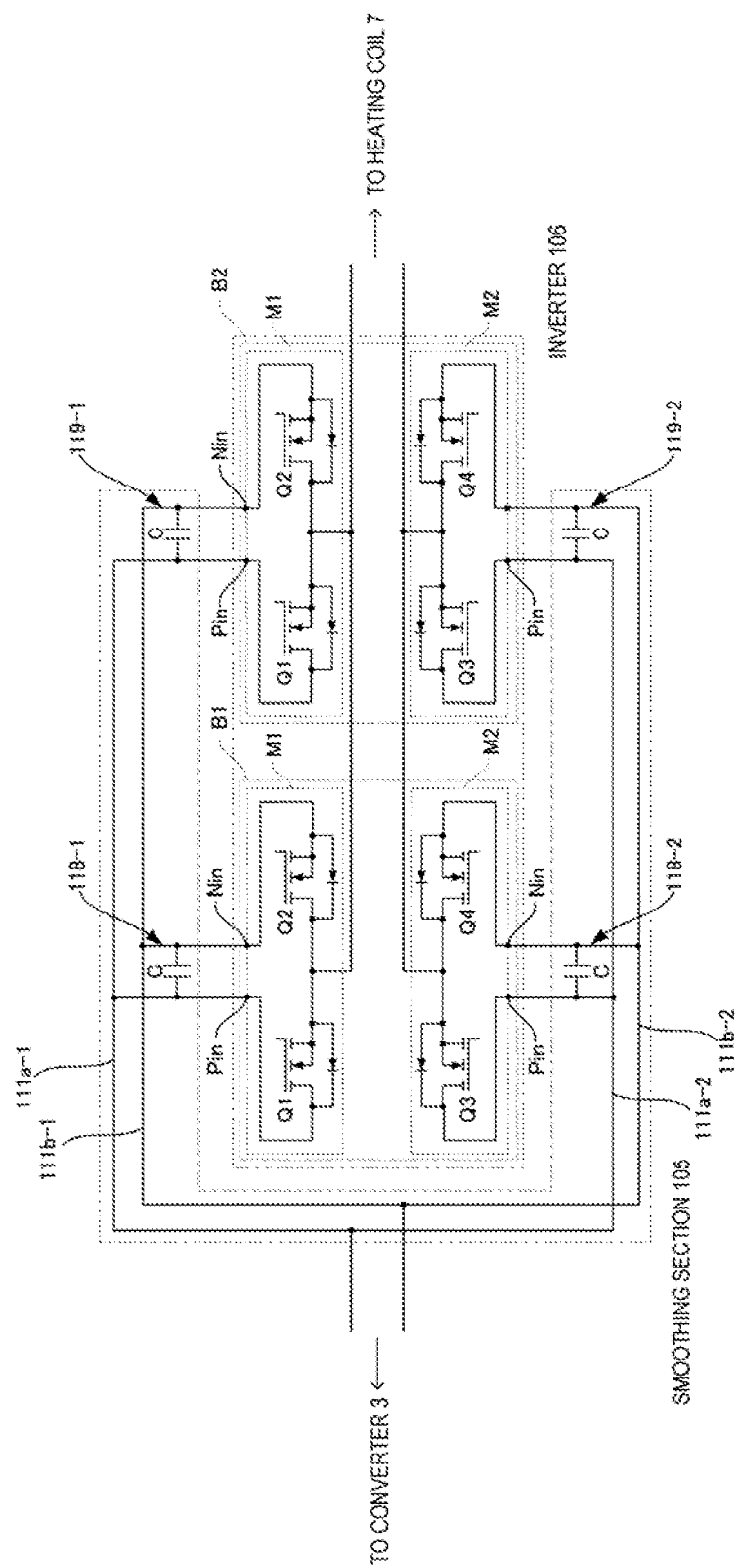
FIG. 11 is a circuit diagram of an induction heating power supply apparatus according to another embodiment of the present invention.

In an example shown in FIG. 11, each arm including the power semiconductor devices Q1, Q2 and each arm including the power semiconductor devices Q3, Q4 are each configured as a module. The first modules M1 each including the power semiconductor devices Q1, Q2 and belonging to a first bridge B1 and a second bridge B2 respectively are connected to a pair of bus bars 111a-1, 111b-1. The second modules M2 each including the power semiconductor devices Q3, Q4 and belonging to the first bridge B1 and the second bridge B2 respectively are connected to a pair of bus bars 111a-2, 111b-2. In this case, the pair of bus bars 111a-1, 111b-1 and the pair of bus bars 111a-2, 111b-2 may be provided in the smoothing section 105, and each of the pair of bus bars 111a-1, 111b-1 and the pair of bus bars 111a-2, 111b-2 may be configured such that, like the pair of bus bars 111a, 111b described above, the pair of bus bars are arranged in a layered manner with an insulator being sandwiched between plate faces of the pair of bus bars. Connection portions to the first modules M1 may be provided in the pair of bus bars 111a-1, 111b-1 on an individual module basis, and connection portions to the second modules M2 may be provided in the pair of bus bars 111a-2, 111b-2 on an individual module basis. At least one capacitor C is connected to each of the connection portions 118-1, 119-1 in the pair of bus bars 11a-1, 11b-1. At least one capacitor is connected to each of the connection portions 118-2 and 119-2 in the pair of bus bars 11a-2, 11b-2.

In the above description, the pair of bus bars 11a, 11b, the pair of bus bars 111a, 111b and the conductors 120a, 120b are all flat plates, i.e. have a rectangular cross section taken along a plane perpendicular to the current flow direction. However, those bus bars may not be flat plates. For example, they may have a semi-circular cross section in a plane perpendicular to the current flow direction. In this case, the external surface of each of bus bars extending in the current flow direction has a flat face forming the diameter portion of the semi-circular cross section and a semi-cylindrical face forming an arc portion of the semi-circular cross section, and the bus bars are arranged in a layered manner such that the flat faces of the bus bars are opposed to each other with an insulator being sandwiched between the flat faces of the bus bars.

This application is based on Japanese Patent Application No. 2015-177757 filed on Sep. 9, 2015, the entire content of which is incorporated herein by reference.

The invention claimed is:

1. An induction heating power supply apparatus comprising:
   a smoothing section configured to smooth a pulsating current of DC power output from a DC power supply section; and
   an inverter configured to convert the DC power smoothed by the smoothing section to AC power,
   wherein the inverter includes a first bridge and a second bridge that are connected in parallel with each other,
   wherein the smoothing section comprises a pair of bus bars connected to the inverter, at least one capacitor connected to the pair of bus bars, and at least one connection member,
   wherein the at least one capacitor includes a first capacitor and a second capacitor and the at least one connection member includes a first connection member and a second connection member,
   wherein each of the bus bars comprises an external surface extending in a current flow direction, the external surface including at least one flat face having a larger surface dimension than another face of the external surface in a direction perpendicular to the current flow direction,
   wherein the pair of bus bars are arranged in a layered manner such that the flat faces of the pair of bus bars are opposed to each other and such that an insulator is sandwiched between the flat faces the pair of bus bars,
   wherein the pair of bus bars are connected to the inverter through the first connection member and the second connection member, and
   wherein the first capacitor is connected to the first bridge of the inverter through the pair of bus bars and the first connection member, and the second capacitor is connected to the second bridge of the inverter through the pair of bus bars and the second connection member.

2. The induction heating power supply apparatus according to claim 1,
   wherein the at least one capacitor comprises a pair of terminals arranged side by side on one side of the at least one capacitor, and
   wherein the pair of terminals are connected to the pair of bus bars such that the pair of terminals extends through the pair of bus bars and the insulator in a direction in which the bus bars and the insulator are layered.

3. The induction heating power supply apparatus according to claim 1,
   wherein each of the first connection member and the second connection member comprises a pair of conductors and an insulator, and
   wherein for each of the first connection member and the second connection member:
      each of the conductors comprises an external surface extending in a current flow direction of each of the conductors, the external surface including at least one flat face having a larger surface dimension than another face of the external surface in a direction perpendicular to the current flow direction of each of the conductors; and
      the pair of conductors are arranged in a layered manner such that the flat faces of the pair of conductors are opposed to each other and such that the insulator is sandwiched between the flat faces of the pair of conductors.

4. The induction heating power supply apparatus according to claim 1, wherein each of the first connection member and the second connection member includes a pair of connection portions.

\* \* \* \* \*